United States Patent
Sugiyama et al.

(10) Patent No.: US 7,718,945 B2
(45) Date of Patent: May 18, 2010

(54) SOLID STATE IMAGING DEVICE INCLUDING PHOTODETECTING SECTION, ROW SELECTING SECTION FOR CHANGING THE ELECTRIC CHARGE ACCUMULATING TIME OF EACH ROW, AND SIGNAL PROCESSING SECTION

(75) Inventors: Yukinobu Sugiyama, Hamamatsu (JP); Seiichiro Mizuno, Hamamatsu (JP)

(73) Assignee: Hamamatsu Photonics K.K., Hamamatsu-shi, Shizuoka (JP)

(*) Notice: Subject to any disclaimer, the term of this patent is extended or adjusted under 35 U.S.C. 154(b) by 0 days.

(21) Appl. No.: 11/918,403

(22) PCT Filed: Apr. 12, 2006

(86) PCT No.: PCT/JP2006/307721

§ 371 (c)(1),
(2), (4) Date: May 14, 2008

(87) PCT Pub. No.: WO2006/112314

PCT Pub. Date: Oct. 26, 2006

(65) Prior Publication Data
US 2009/0084937 A1 Apr. 2, 2009

(30) Foreign Application Priority Data
Apr. 14, 2005 (JP) .............................. 2005-117388

(51) Int. Cl.
*H01L 27/00* (2006.01)
(52) U.S. Cl. .................................. 250/208.1; 250/214 R
(58) Field of Classification Search ............... 250/208.1, 250/214 R; 348/302–311, 294–296, 230.1
See application file for complete search history.

(56) References Cited

U.S. PATENT DOCUMENTS

| 6,452,632 B1 | 9/2002 | Umeda et al. |
| 6,972,791 B1 * | 12/2005 | Yomeyama .............. 348/230.1 |
| 2002/0145669 A1 | 10/2002 | Umeda et al. |

FOREIGN PATENT DOCUMENTS

| JP | 10-224696 | 8/1998 |
| JP | 2000-236478 | 8/2000 |
| JP | 2004-129015 | 4/2004 |

* cited by examiner

*Primary Examiner*—Que T Le
(74) *Attorney, Agent, or Firm*—Drinker Biddle & Reath LLP

(57) ABSTRACT

A solid-state imaging device 1 is provided with (1) a photodetecting section 11 in which M×N of pixels are two-dimensionally arranged in M rows and N columns, and a pixel $P_{m,n}$ at the m-th row and the n-th column includes a photodiode $PD1_{m,n}$, (2) a row selecting section 20 that selects one or more rows, out of M rows of the photodetecting section 11, instructs each pixel in the selected rows to accumulate an electric charge generated in the photodiode $PD1_{m,n}$ in response to the incidence of light, and instructs to output data corresponding to the amount of accumulated electric charge of each pixel by each row of the photodetecting section 11, and (3) a first signal processing section 30 that inputs data of each pixel, outputted by each row of the photodetecting section 11 by an instruction from the row selecting section 20, and outputs the data by each pixel.

7 Claims, 9 Drawing Sheets

US 7,718,945 B2

SOLID STATE IMAGING DEVICE INCLUDING PHOTODETECTING SECTION, ROW SELECTING SECTION FOR CHANGING THE ELECTRIC CHARGE ACCUMULATING TIME OF EACH ROW, AND SIGNAL PROCESSING SECTION

TECHNICAL FIELD

The present invention relates to a solid-state imaging device capable of imaging a two-dimensional image.

BACKGROUND ART

Solid-state imaging devices for imaging a two-dimensional image are provided with a photodetecting section in which M×N pixels, each of which includes a photodiode, are two-dimensionally arranged in M rows and N columns. In each pixel of the photodetecting section, an amount of an electric charge of which corresponds to intensity of an incident light is generated in the photodiode, and accumulated therein. Data corresponding to an amount of accumulated electric charge is outputted. Subsequently, based on the data by each pixel, an image of light incident upon the photodetecting section is obtained. In a CMOS image sensor described in the below-described patent document 1, a substrate bias voltage is changed while the electric charge is being accumulated into the photodiode, and thereby, lowering of a read voltage and enlarging of a dynamic range are implemented.

Patent document 1: Japanese Published Unexamined Patent Application No. 2004-129015

DISCLOSURE OF THE INVENTION

Problems to be Solved by the Invention

Conventionally, when the contrast of light intensity among pixels in an image to be imaged by the solid-state imaging device is larger than a dynamic range of photodetection of each pixel of the solid-state imaging device, data outputted from a pixel of which light intensity is high is saturated, or data outputted from a pixel of which light intensity is low is buried in noise, and thus, a high-quality image cannot be obtained.

The present invention has been achieved to overcome the problems, and an object thereof is to provide a solid-state imaging device capable of obtaining a high-quality image even when the contrast of light intensity among pixels in an image is larger than a dynamic range of photodetection of each pixel.

Means for Solving the Problems

A solid-state imaging device according to the present invention is provided with (1) a photodetecting section in which M×N of pixels are two-dimensionally arranged in M rows and N columns, and a pixel $P_{m,n}$ at the m-th row and the n-th column includes a photodiode $PD1_{m,n}$, (2) a row selecting section that selects one or more rows, out of M rows of the photodetecting section, instructs each pixel in the selected rows to accumulate an electric charge generated in the photodiode $PD1_{m,n}$ in response to the incidence of light, and instructs to output data corresponding to an amount of accumulated electric charge of each pixel by each row of the photodetecting section, and (3) a first signal processing section that inputs data of each pixel, outputted by each row of the photodetecting section by an instruction from the row selecting section, and outputs the data by each pixel, where M and N each represent an integer of 2 or more, m represents any integer equal to or greater than 1 but equal to or smaller than M, and n represents any integer equal to or greater than 1 but equal to or smaller than N.

In the solid-state imaging device according to the present invention, M×N of pixels included in the photodetecting section are two-dimensionally arranged in the M rows and the N columns, and the pixel $P_{m,n}$ at the m-th row and the n-th column includes the photodiode $PD1_{m,n}$. By the row selecting section, one or more rows are selected, out of M rows of the photodetecting section, and an electric charge generated in the photodiode $PD1_{m,n}$ in response to the incidence of light is accumulated in each pixel existing in the selected rows. Further, after the electric-charge accumulation in each pixel, outputting of data, by each row of the photodetecting section, corresponding to an amount of accumulated electric charge of each pixel is instructed by the row selecting section. The data of each pixel, outputted by each row of the photodetecting section by the instruction from the row selecting section, is input to a first signal processing section, and outputted by each pixel from the first signal processing section.

The accumulation of the electric charge in each pixel of the rows, out of M rows of the photodetecting section, selected by the row selecting section may be performed in one period only, and in a plurality of periods as well. When the electric-charge accumulating periods are a plurality, these periods may be constant time periods, or different time periods. The row of the photodetecting section in which the electric charge is accumulated in each of the plurality of periods may be partially or entirely overlapped or completely different. The electric charge generated in the photodiode $PD1_{m,n}$ in only a desired time (which includes a case of a time 0) in each of the M rows of the photodetecting section can be thus accumulated, and thus, the sensitivity of photodetection can be differed by each row. That is, even when the contrast of light intensity among the pixels in an image to be imaged is large, it is possible to shorten the electric-charge accumulating time in the row including a pixel of which light intensity in the image is strong, as compared to other rows. Thereby, an image of higher quality can be obtained.

The solid-state imaging device according to the present invention is preferable such that (1) each pixel $P_{m,n}$ of the photodetecting section further includes a photodiode $PD2_{m,n}$ and N of photodiodes $PD2_{m,1}$ to $PD2_{m,N}$ in the m-th row that are electrically connected by a wiring $L2_m$, and (2) it further includes a second signal processing section that inputs and accumulates electric charges generated in the N of photodiodes $PD2_{m,1}$ to $PD2_{m,N}$ connected to each wiring $L2_m$, and outputs a voltage value that corresponds to an amount of the accumulated electric charges. Further, the solid-state imaging device is preferable such that (1) each pixel $P_{m,n}$ of the photodetecting section further includes a photodiode $PD3_{m,n}$ and M of photodiodes $PD3_{1,n}$ to $PD3_{M,n}$ in the n-th column that are electrically connected by a wiring $L3_n$, and (2) it further includes a third signal processing section that inputs and accumulates electric charges generated in the M of photodiodes $PD3_{1,n}$ to $PD3_{M,n}$ connected to each wiring $L3_n$, and outputs a voltage value that corresponds to an amount of the accumulated electric charges.

In this case, addition of a two dimensional distribution of intensity of light incident upon the photodetecting section in the column direction (that is, a one dimensional distribution in the row direction of the intensity of light incident upon the photodetecting section) is obtained by the photodiode $PD2_{m,n}$ included in each pixel $P_{m,n}$ and the second signal processing section. Further, addition of a two dimensional distribution of intensity of light incident upon the photodetecting section in the row direction (that is, a one dimensional distribution in the column direction of the intensity of light incident upon the photodetecting section) is obtained by the photodiode $PD3_{m,n}$ included in each pixel $P_{m,n}$ and the third signal processing section. When the results are used, the electric-charge accumulating time in each row of the photodetecting section can be set more appropriately by the row selecting section.

Effect of the Invention

According to the present invention, even when the contrast of light intensity among pixels in an image to be imaged by the solid-state imaging device is larger than a dynamic range of photodetection of each pixel of the solid-state imaging device, a high-quality image can be obtained.

BRIEF DESCRIPTION OF THE DRAWINGS

FIG. 5-(b) a timing chart of a Vlatch signal; FIG. 5-(c) a timing chart of a Vst signal; FIG. 5-(d) a timing chart of a Vclk signal; FIG. 5-(e) a timing chart of a Vreset signal; FIG. 5-(f) a timing chart of a Vtrans signal; FIG. 5-(g) a timing chart of a Vhold signal; and FIG. 5-(h) a timing chart of a Vadrs signal.

FIG. 6-(b) a timing chart of a Vlatch signal; FIG. 6-(c) a timing chart of a Vst signal; FIG. 6-(d) a timing chart of a Vclk signal; FIG. 6-(e) a timing chart of a Vreset signal; FIG. 6-(f) a timing chart of a Vtrans signal; FIG. 6-(g) a timing chart of a Vhold signal; FIG. 6-(h) a timing chart of a Vadrs signal; FIG. 6-(i) a timing chart of an Hst signal; FIG. 6-(j) a timing chart of an Hclk signal; and FIG. 6-(k) a timing chart of a Video signal.

BEST MODES FOR CARRYING OUT THE INVENTION

Figure 1:
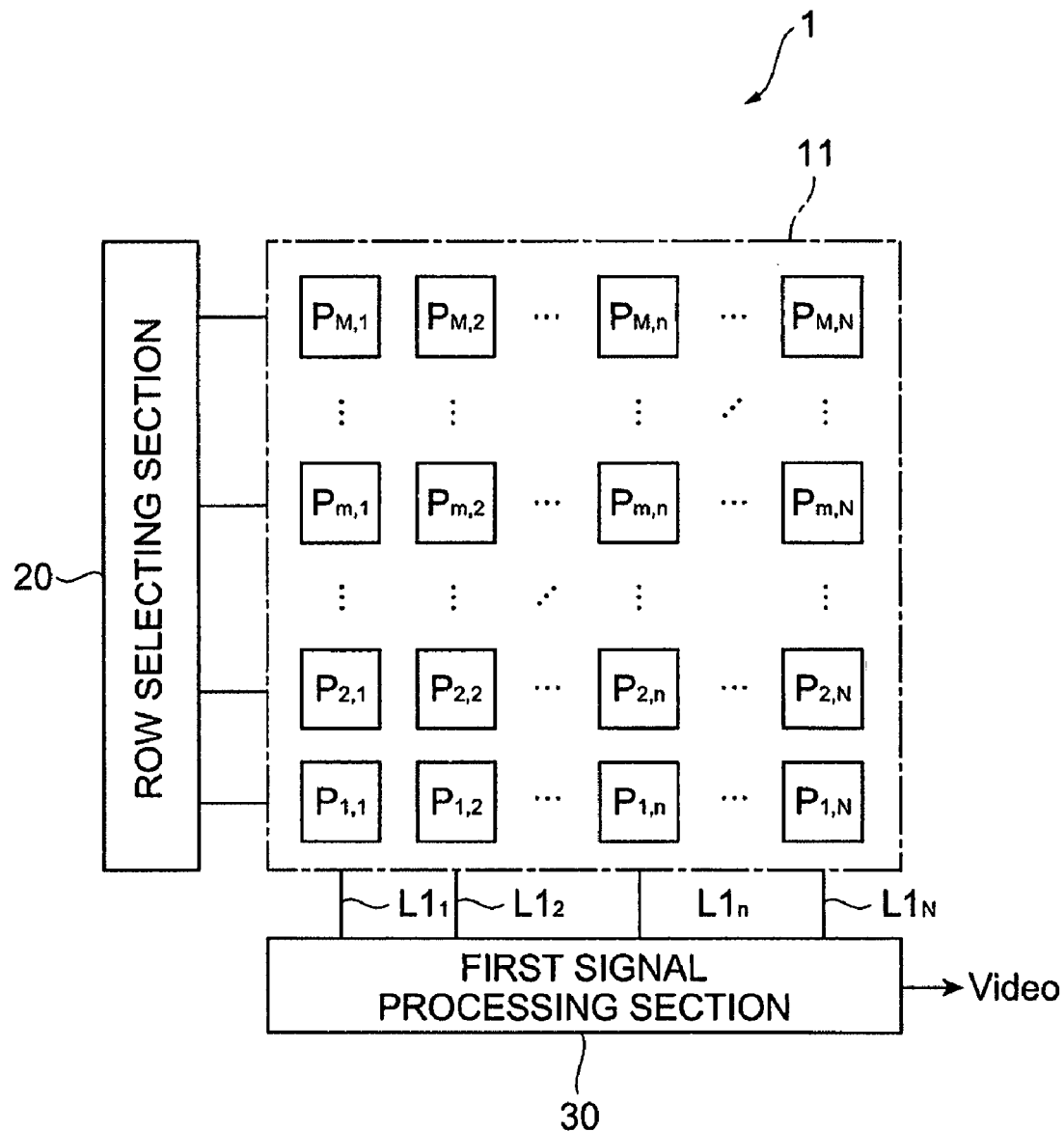
FIG. 1 is a block diagram of a solid-state imaging device 1 according to a first embodiment.

Hereinafter, the best mode for carrying out the present invention is described in detail with reference to the accompanying drawings. It is noted that in the descriptions of the drawings, identical components are designated with the same reference numerals to omit overlapping description.

First Embodiment

First, a first embodiment of a solid-state imaging device according to the present invention is described. FIG. 1 is a block diagram of a solid-state imaging device 1 according to the first embodiment. The solid-state imaging device 1 shown in this drawing is provided with a photodetecting section 11, a row selecting section 20, and a first signal processing section 30.

The photodetecting section 11 includes M×N of pixels $P_{1,1}$ to $P_{M,N}$ two-dimensionally arranged in M rows and N columns. A pixel $P_{m,n}$ is positioned at the m-th row and the n-th column. Each pixel $P_{m,n}$ has a configuration common to one another, and includes a photodiode $PD1_{m,n}$ that generates an electric charge in response to the incidence of light. N of pixels $P_{m,1}$ to $P_{m,N}$ in the m-th row are applied a common control signal from the row selecting section 20. M of pixels $P_{1,n}$ to $P_{M,n}$ in the n-th column are connected by a common wiring $L1_n$ to the first signal processing section 30. Herein, M and N each represent an integer of 2 or more, m represents any integer equal to or greater than 1 but equal to or smaller than M, and n represents any integer equal to or greater than 1 but equal to or smaller than N.

By the control signal applied to the photodetecting section 11, the row selecting section 20 selects one or more rows, out of M rows of the photodetecting section 11, and instructs each pixel existing in the selected rows to accumulate the electric charge generated in the photodiode $PD1_{m,n}$ in response to the incidence of light. Further, by the control signal applied to the photodetecting section 11, the row selecting section 20 instructs to output data corresponding to an amount of accumulated electric charge of each pixel by each row of the photodetecting section 11. The first signal processing section 30 inputs via the wiring $L1_n$ the data of each pixel, outputted by each row of the photodetecting section 11 by the instruction from the row selecting section 20, and outputs the data by each pixel.

Figure 2:
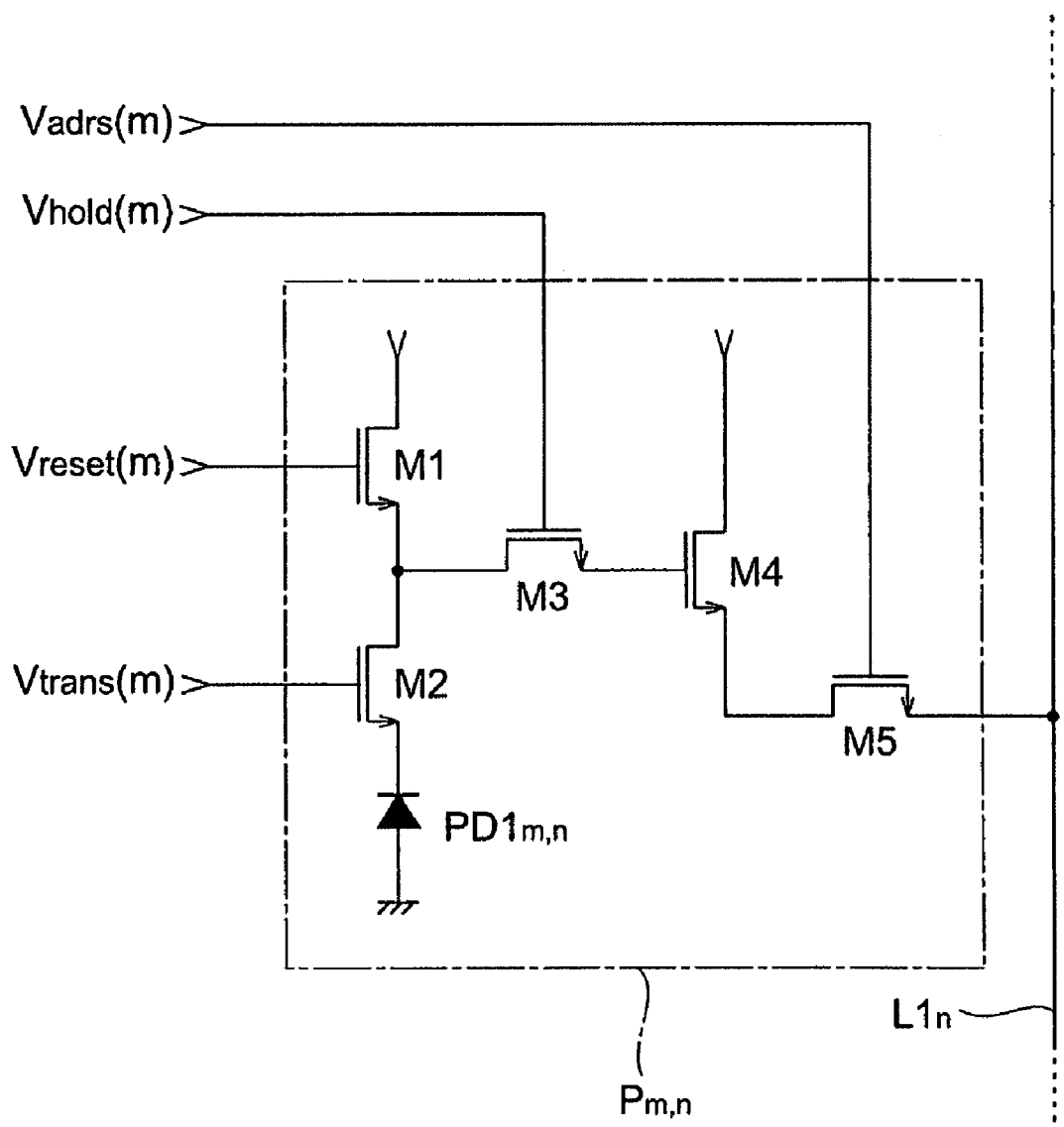
FIG. 2 is a circuit diagram of each pixel $P_{m,n}$ included in a photodetecting section 11 of the solid-state imaging device 1 according to the first embodiment.

FIG. 2 is a block diagram of each pixel $P_{m,n}$ included in the photodetecting section 11 of the solid-state imaging device 1 according to the first embodiment. Each pixel $P_{m,n}$ is APS (Active Pixel Sensor)-configured, and includes the photodiode $PD1_{m,n}$ and five FET transistors M1 to M5. A reference voltage is input to a drain terminal of the transistor M1. A source terminal of the transistor M1 is connected to a drain terminal of the transistor M2. A source terminal of the transistor M2 is connected to a cathode terminal of the photodiode $PD1_{m,n}$. An anode terminal of the photodiode $PD1_{m,n}$ is grounded.

A drain terminal of the transistor M3 is connected to the source terminal of the transistor M1 and the drain terminal of the transistor M2. A source terminal of the transistor M3 is connected to a gate terminal of the transistor M4. A drain terminal of the transistor M4 inputs a reference voltage. A source terminal of the transistor M4 is connected to a drain terminal of the transistor M5. A source terminal of the transistor M5 is connected via the wiring $L1_n$ to the first signal processing section 30. The transistor M4 and the transistor M5 configure a source follower circuit.

A Vreset(m) signal is input to a gate terminal of the transistor M1. A Vtrans(m) signal is input to a gate terminal of the transistor M2. A Vhold(m) signal is input to a gate terminal of the transistor M3. Further, a Vadrs(m) signal is input to a gate terminal of the transistor M5. The Vreset(m) signal, the Vtrans(m) signal, the Vhold(m) signal, and the Vadrs(m) signal are outputted from the row selecting section 20 commonly to the N of pixels $P_{m,1}$ to $P_{m,N}$ in the m-th row of the photodetecting section 11.

When the Vreset(m) signal and the Vtrans(m) signal are at a high level, a junction capacitance section of the photodiode $PD1_{m,n}$ is discharged, and when the Vhold(m) signal is also at a high level, an electric potential of the gate terminal of the transistor M4 is also initialized, and an output voltage value to the wiring $L1_n$ is initialized. When the Vreset(m) signal, the Vtrans(m) signal, and the Vhold(m) signal are at a low level, the electric charge generated in the photodiode $PD1_{m,n}$ in response to the incidence of light is accumulated in the junction capacitance section. When the Vreset(m) signal is at a low level and the Vtrans(m) signal and the Vhold (m) signal are at a high level, the electric charge accumulated in the junction capacitance section of the photodiode $PD1_{m,n}$ is transferred to the gate terminal of the transistor M4, and when the Vadrs(m) signal is at a high level, a voltage value corresponding to an amount of electric charge is outputted to the wiring $L1_n$.

Figure 3:
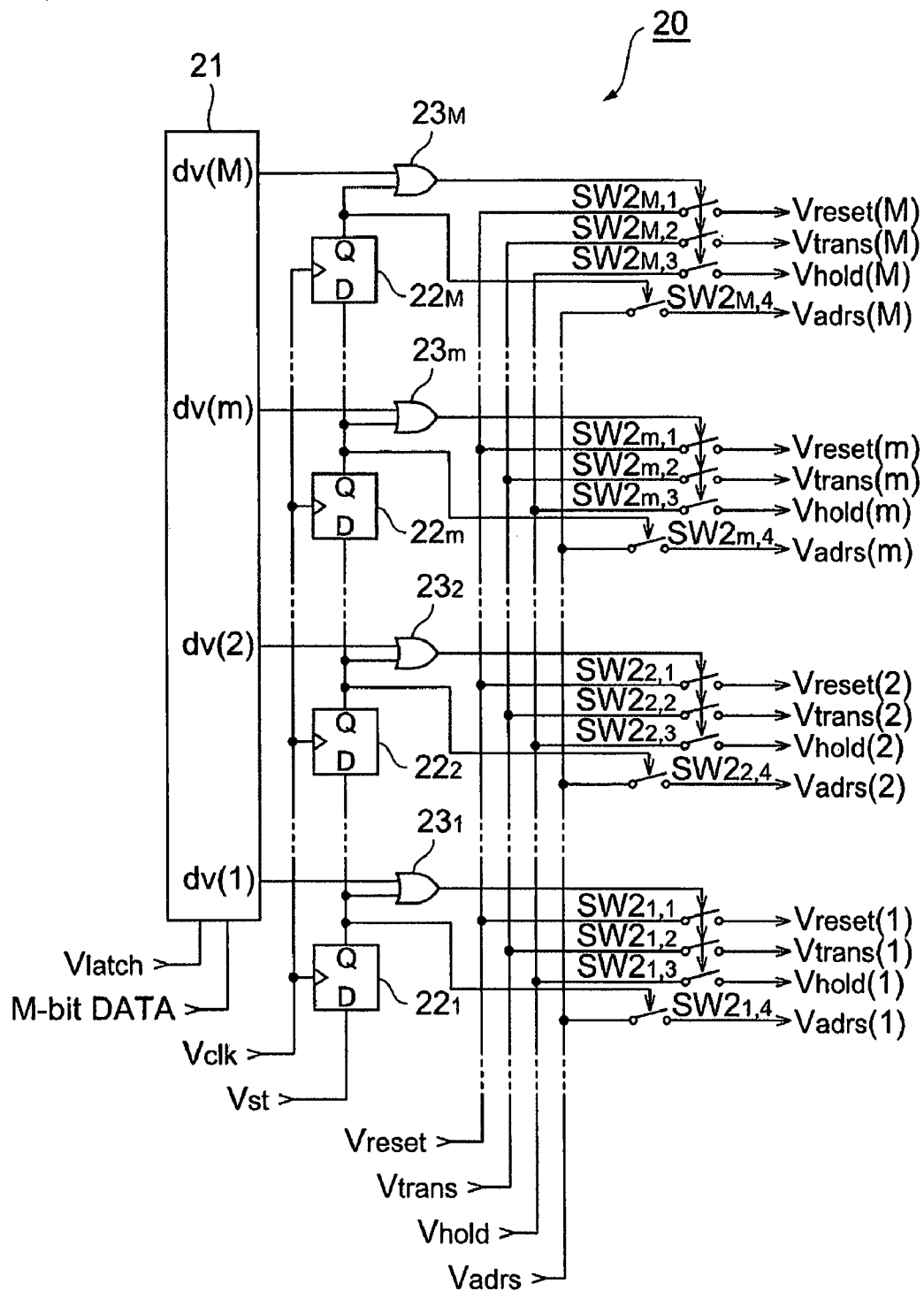
FIG. 3 is a circuit diagram of a row selecting section 20 of the solid-state imaging device 1 according to the first embodiment.

FIG. 3 is a circuit diagram of the row selecting section 20 of the solid-state imaging device 1 according to the first embodiment. The row selecting section 20 includes a latch circuit 21, M of D flip-flops $22_1$ to $22_M$, M of OR-gate circuits $23_1$ to $23_M$, 4M of switches $SW2_{1,1}$ to $SW2_{M,4}$.

A Vlatch signal and M-bit data are input to the latch circuit 21, holds as dv(m) a level of the m-th bit, out of the M-bit data, at the timing that the Vlatch signal is inverted from a high level to a low level, and from this point onward, outputs the held levels of dv(1) to dv(M). For example, when it is desired to output from the latch circuit 21 all dv(1) to dv(M) as a high level, all bits of the M-bit data input into the latch circuit 21 are rendered a high level. When it is desired to output from the latch circuit 21 all dv(1) to dv(M) as a low level, all bits of the M-bit data input into the latch circuit 21 are rendered a low level. When it is desired to output from the latch circuit 21 dv(1) only, out of dv(1) to dv(M), as a high level, the M-bit data input into the latch circuit 21 is rendered [000 . . . 01] (the least significant bit only is rendered a high level).

From this point onward, each D flip-flop $22_m$ outputs a level, which has been inputted into a D input terminal when a Vclk signal to be inputted is inverted from a low level to a high level, from a Q output terminal. The M of D flip-flops $22_1$ to $22_M$ are dependently connected. A Vst signal is input to D input terminal of the first-stage D flip-flop $22_1$. Levels outputted from Q output terminals of the D flip-flops $22_{m-1}$ of the foregoing stages is input to D input terminals of the D flip-flops $22_m$ after the second stage. That is, the M of D flip-flops $22_1$ to $22_M$ configure a shift register.

Each OR-gate circuit $23_m$ inputs the level dv(m) outputted from the latch circuit 21 and inputs the level, as well, outputted from the Q output terminal of the D flip-flop $22_m$, and outputs levels of logical OR of the two levels.

Each switch $SW2_{m,1}$ is closed when the output level from the OR-gate circuit $23_m$ is at a high level, and outputs the Vreset signal, which is to be inputted to one end, from the other end as the Vreset(m) signal, to each pixel in the m-th row of the photodetecting section 11. Each switch $SW2_{m,2}$ is closed when the output level from the OR-gate circuit $23_m$ is at a high level, and outputs the Vtrans signal, which is to be inputted to one end, from the other end as the Vtrans(m) signal, to each pixel in the m-th row of the photodetecting section 11.

Each switch $SW2_{m,3}$ is closed when the output level from the OR-gate circuit $23_m$ is at a high level, and outputs the Vhold signal, which is to be inputted to one end, from the other end as the Vhold(m) signal, to each pixel in the m-th row of the photodetecting section 11. Each switch $SW2_{m,4}$ is closed when the output level from the Q output terminal of the D flip-flop $22_m$ is at a high level, and outputs the Vadrs signal, which is to be inputted to one end, from the other end as the Vadrs(m) signal, to each pixel in the m-th row of the photodetecting section 11.

In the row selecting section 20, when an electric-charge accumulating operation is performed in a pixel in any row of the photodetecting section 11, an output logical value from the Q output terminal from each of the M of D flip-flops $22_1$ to $22_M$ is rendered a low level. The M-bit data of which any bit is at a high level is input to the latch circuit 21, the dv(m) that corresponds to the bit at a high level is outputted from the latch circuit 21 as a high level, the output logical value from the OR-gate circuit $23_m$ is rendered a high level, and then, the switches $SW2_{m,1}$ to $SW2_{m,3}$ are closed. With this state, each of the Vreset signal, the Vtrans signal, and the Vhold signal is changed at predetermined timing, and thereby, the Vreset(m) signal, the Vtrans(m) signal, and the Vhold(m) signal are applied at the similar timing to the pixels in the row that corresponds to the bit rendered a high level in the M-bit data. As a result, the electric-charge accumulating operation is performed in these pixels.

On the other hand, when a data readout operation is performed from the photodetecting section 11, prior to the operation, the M-bit data in which all bits are at a low level is input to the latch circuit 21, and all dv(1) to dv(M) outputted from the latch circuit 21 are rendered a low level. With this state, the shift register configured of the M of D flip-flops $22_1$ to $22_M$ is operated, and the output logical value from the Q output terminal of each of the M of D flip-flops $22_1$ to $22_M$ is sequentially rendered a high level. At the same time, the output logical value from each of the M of OR-gate circuit $23_1$ to $23_M$ is sequentially rendered a high level, and the switches $SW2_{m,1}$ to $SW2_{m,4}$ that correspond to the D flip-flop $22_m$ and the OR-gate circuit $23_m$ in which the output logical values are at a high level are closed. The Vreset signal, the Vhold signal, and the Vadrs signal are changed at a predetermined timing, respectively. Thereby, the Vreset(m) signal, the Vhold(m) signal, and the Vadrs(m) signal are sequentially applied at the similar timing to the first row to the M-th row of the photodetecting section 11. As a result, the data readout operation is performed.

Figure 4:
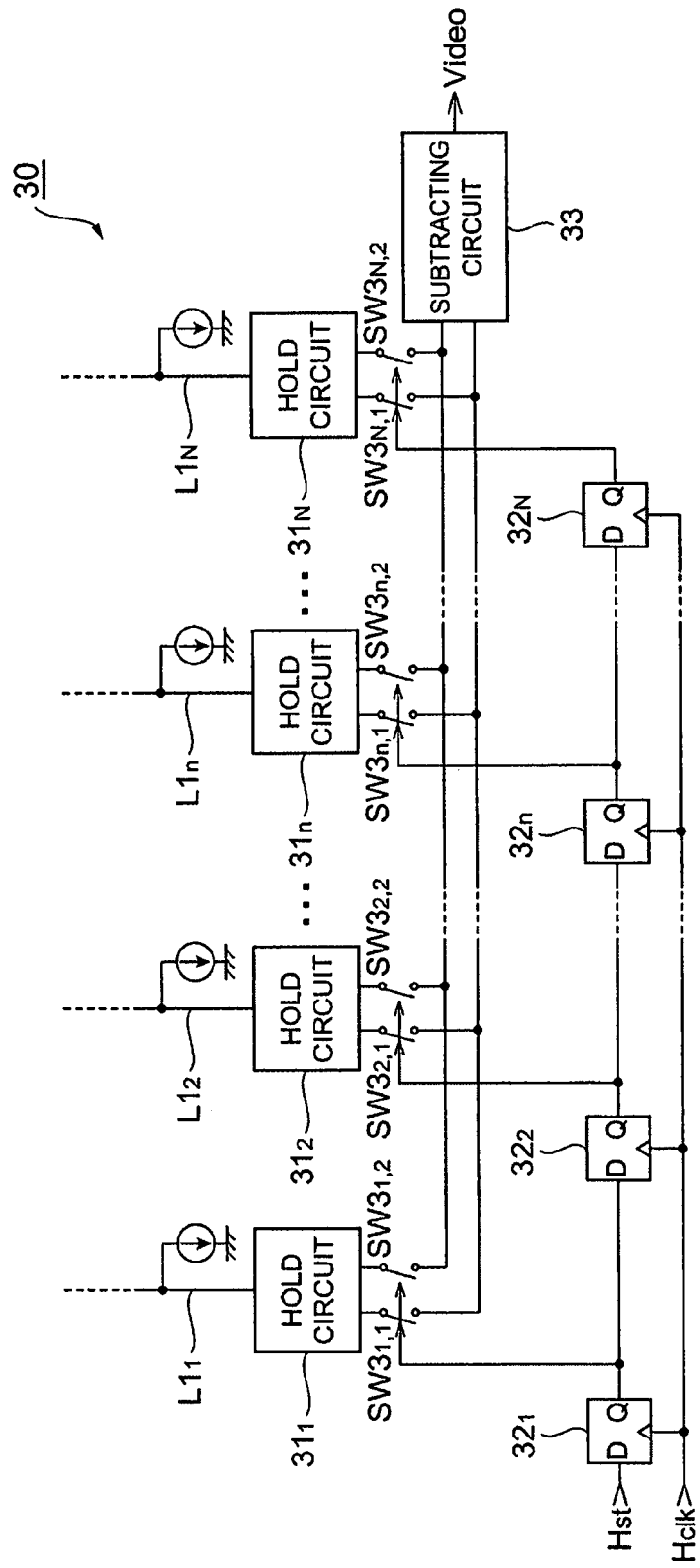
FIG. 4 is a circuit diagram of a first signal processing section 30 of the solid-state imaging device 1 according to the first embodiment.

FIG. 4 is a circuit diagram of the first signal processing section 30 of the solid-state imaging device 1 according to the first embodiment. The first signal processing section 30 includes N of hold circuits $31_1$ to $31_N$, N of D flip-flops $32_1$ to $32_N$, a subtracting circuit 33, and 2N of switches $SW3_{1,1}$ to $SW3_{N,2}$.

Each hold circuit $31_n$ inputs and holds a voltage value, which is outputted from a pixel $P_{m,n}$ in any row of the photodetecting section 11 to the wiring $L1_n$, and outputs the held voltage value. Each hold circuit $31_n$ can hold voltage values of two time periods different from each other. In this case, one voltage value is a noise component, and the other voltage value is a lighted output component in which the noise component is superimposed. Each wiring $L1_n$ is connected with a constant current source.

After this point onward, each D flip-flop $32_n$ outputs a value, which has been inputted to the D input terminal when the Hclk signal to be inputted is inverted from a low level to a high level, from the Q output terminal. The N of D flip-flops $32_1$ to $32_N$ are dependently connected. The Hst signal is input to a D input terminal of the first-stage D flip-flop $32_1$. Values outputted from the Q output terminals of the D flip-flops $32_{n-1}$ of the foregoing stages are input to D input terminals of the D flip-flops $32_n$ after the second stage. That is, the N of D flip-flops $32_1$ to $32_N$ configure a shift register.

The switches $SW3_{n,1}$ and $SW3_{n,2}$ arranged on an output side of each hold circuit $31_n$ are closed when the output value from the Q output terminal of the D flip-flop $32_n$ is at a high level, and inputs to the subtracting circuit 33 two voltage values outputted from the hold circuit $31_n$. The subtracting circuit 33 outputs a voltage value Video that corresponds to a difference of the two inputted voltage values.

Subsequently, an operation of the solid-state imaging device 1 according to the first embodiment is described by using FIG. 5 and FIG. 6.

Figure 5:
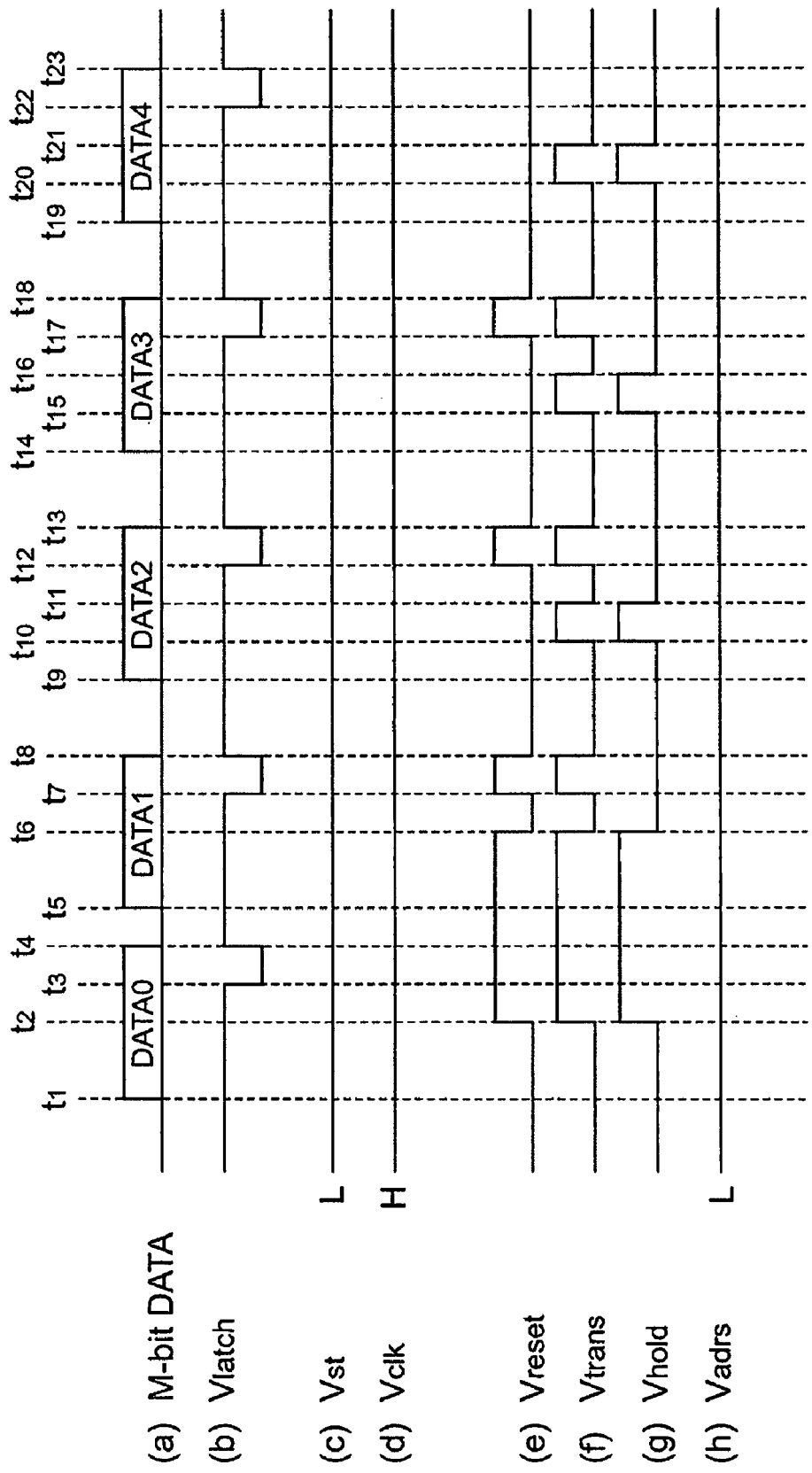
FIG. 5 is a timing chart for describing an electric-charge accumulating operation in the photodetecting section 11 of the solid-state imaging device 1 according to the first embodiment, in which FIG. 5-(a) indicates a timing chart of M-bit data.

FIG. 5 is a timing chart for describing the electric-charge accumulating operation in the photodetecting section 11 of the solid-state imaging device 1 according to the first embodiment.

FIG. 5-(a) indicates a timing chart of the M-bit data; FIG. 5-(b) a timing chart of the Vlatch signal; FIG. 5-(c) a timing chart of the Vst signal; FIG. 5-(d) a timing chart of the Vclk signal; FIG. 5-(e) a timing chart of the Vreset signal; FIG. 5-(f) a timing chart of the Vtrans signal; FIG. 5-(g) a timing chart of the Vhold signal; and FIG. 5-(h) a timing chart of the Vadrs signal.

In FIG. 5, FIG. 5-(a) shows the M-bit data input to the row selecting section 20; FIG. 5-(b) the Vlatch signal input to the row selecting section 20; FIG. 5-(c) the Vst signal input to the row selecting section 20; FIG. 5-(d) the Vclk signal input to the row selecting section 20; FIG. 5-(e) Vreset signal input to the row selecting section 20; FIG. 5-(f) the Vtrans signal input to the row selecting section 20; FIG. 5-(g) the Vhold signal input to the row selecting section 20; and FIG. 5-(h) the Vadrs signal input to the row selecting section 20.

The electric-charge accumulating operation in the photodetecting section 11 of the solid-state imaging device 1 according to the first embodiment is performed as below, which is shown in FIG. 5. In a period of the electric-charge accumulating operation, the Vst signal input to the row selecting section 20 constantly remains at a low level, the Vclk signal input to the row selecting section 20 constantly remains at a high level, the Vadrs signal input to the row selecting section 20 constantly remains at a low level, and the Hst signal input to the first signal processing section 30 constantly remains at a low level.

In a period from a time $t_1$ to a time $t_4$, M-bit data DATA0 in which all bits are at a high level are input to the latch circuit 21 of the row selecting section 20. In a period from a time $t_2$ to a time $t_6$, all the Vreset signal, the Vtrans signal, and the Vhold signal to be inputted to the row selecting section 20 become a high level. The Vlatch signal is inverted from a high level to a low level at a time $t_3$, and inverted to a high level at the time $t_4$.

At the time $t_3$ at which the Vlatch signal is inverted to a low level, the M-bit data DATA0 is held by the latch circuit 21. Thereafter, the held data is outputted from the latch circuit 21 as dv(1) to dv(M). The dv(1) to dv(M) outputted at this time are all at a high level. Thereby, the junction capacitance sections of the photodiodes $PD1_{m,n}$ are discharged in all the pixels $P_{1,1}$ to $P_{M,N}$ included in the photodetecting section 11. Further, the electric potential of the gate terminal of the transistor M4 is initialized, and the output voltage values to all the wirings $L1_n$ are also initialized.

In a period from a time $t_5$ to a time $t_8$, M-bit data DATA1 in which only a bit that corresponds to a next row in which the electric charge is to be accumulated in the photodetecting section 11 is at a high level is input to the latch circuit 21 of the row selecting section 20. In a period from a time $t_7$ to the time $t_8$, both the Vreset signal and the Vtrans signal to be inputted to the row selecting section 20 become a high level, but the Vhold signal remains at a low level. The Vlatch signal is inverted to a low level at the time $t_7$, and inverted to a high level at the time $t_8$. The Vtrans signal and the Vhold signal become a high level in a period from a time $t_{10}$ to a time $t_{11}$.

At the time $t_7$ at which the Vlatch signal is inverted to a low level, the M-bit data DATA1 is held by the latch circuit 21, and thereafter, the held data is outputted from the latch circuit 21 as dv(1) to dv(M). In the dv(1) to dv(M) outputted at this time, a bit that corresponds to a next row in which the electric charge is to be accumulated in the photodetecting section 11 is at a high level, and other bits are at a low level. Thereby, in each pixel $P_{m,n}$ in the m-th row of which dv(m) is at a high level, the junction capacitance section of the photodiode $PD1_{m,n}$ is discharged in the period from the time $t_7$ to the time $t_8$ during which the Vreset signal and the Vtrans signal are at a high level, an electric charge generated in the photodiode $PD1_{m,n}$ in a subsequent period from the time $t_8$ to the time $t_{10}$ is accumulated in the junction capacitance section, and the electric charge is transferred from the junction capacitance section to the gate terminal of the transistor M4 in a next subsequent period from the time $t_{10}$ to the time $t_{11}$ during which the Vtrans signal and the Vhold signal are at a high level.

In a period from a time $t_9$ to a time $t_{13}$, M-bit data DATA2 in which only a bit that corresponds to a next row in which the electric charge is to be accumulated in the photodetecting section 11 is at a high level is input to the latch circuit 21 of the row selecting section 20. In a period from a time $t_{12}$ to a time $t_{13}$, both the Vreset signal and the Vtrans signal to be inputted to the row selecting section 20 become a high level, but the Vhold signal remains at a low level. The Vlatch signal is inverted to a low level at the time $t_{12}$, and inverted to a high level at the time $t_{13}$. The Vtrans signal and the Vhold signal become a high level in a period from a time $t_{15}$ to a time $t_{16}$.

At the time $t_{12}$ at which the Vlatch signal is inverted to a low level, the M-bit data DATA2 is held by the latch circuit 21, and thereafter, the held data is outputted from the latch circuit 21 as dv(1) to dv(M). In the dv(1) to dv(M) outputted at this time, a bit that corresponds to a next row in which the electric charge is to be accumulated in the photodetecting section 11 is at a high level, and other bits are at a low level. Thereby, in each pixel $P_{m,n}$ in the m-th row of which dv(m) is at a high level, the junction capacitance section of the photodiode $PD1_{m,n}$ is discharged in the period from the time $t_{12}$ to the time $t_{13}$ during which the Vreset signal and the Vtrans signal are at a high level, an electric charge generated in the photodiode $PD1_{m,n}$ in the subsequent period from the time $t_{13}$ to the time $t_{15}$ is accumulated in the junction capacitance section, and the electric charge is transferred from the junction capacitance section to the gate terminal of the transistor M4 in the next subsequent period from the time $t_{15}$ to the time $t_{16}$ during which the Vtrans signal and the Vhold signal are at a high level.

In a period from a time $t_{14}$ to a time $t_{18}$, M-bit data DATA3 in which only a bit that corresponds to a next row in which the electric charge is to be accumulated in the photodetecting section 11 is at a high level is inputted to the latch circuit 21 of the row selecting section 20. In a period from a time $t_{17}$ to the time $t_{18}$, both the Vreset signal and the Vtrans signal to be inputted to the row selecting section 20 become a high level, but the Vhold signal remains at a low level. The Vlatch signal is inverted to a low level at the time $t_{17}$, and inverted to a high level at the time $t_{18}$. The Vtrans signal and the Vhold signal become a high level in a period from a time $t_{20}$ to a time $t_{21}$.

At the time $t_{17}$ at which the Vlatch signal is inverted to a low level, the M-bit data DATA3 is held by the latch circuit 21, and thereafter, the held data is outputted from the latch circuit 21 as dv(1) to dv(M). In the dv(1) to dv(M) outputted at this time, a bit that corresponds to a next row in which the electric charge is to be accumulated in the photodetecting section 11 is at a high level, and other bits are at a low level. Thereby, in each pixel $P_{m,n}$ in the m-th row of which dv(m) is at a high level, the junction capacitance section of the photodiode $PD1_{m,n}$ is discharged in the period from the time $t_{17}$ to the time $t_{18}$ during which the Vreset signal and the Vtrans signal are at a high level, an electric charge generated in the photodiode $PD1_{m,n}$ in the subsequent period from the time $t_{18}$ to the time $t_{20}$ is accumulated in the junction capacitance section, and the electric charge is transferred from the junction capacitance section to the gate terminal of the transistor M4 in the next subsequent period from the time $t_{20}$ to the time $t_{21}$ during which the Vtrans signal and the Vhold signal are at a high level.

In a period from a time $t_{19}$ to a time $t_{23}$, M-bit data DATA4 in which all bits are at a low level is input to the latch circuit 21 of the row selecting section 20. The Vlatch signal is inverted from a high level to a low level at a time $t_{22}$, and inverted to a high level at the time $t_{23}$. At the time $t_{22}$ at which the Vlatch signal is inverted to a low level, the M-bit data DATA4 is held by the latch circuit 21, and thereafter, the held data is outputted from the latch circuit 21 as dv(1) to dv(M). The dv(1) to dv(M) outputted at this time are all low level. Thereby, the electric-charge accumulating operation is ended, and thereafter, a data readout operation is enabled.

As described above, the accumulation and transfer operations of the electric charge in a period T1 from the time $t_8$ to the time $t_{11}$ are performed in each pixel $P_{m,n}$ in the m-th row, in which the dv(m) designated by the M-bit data DATA1 is at a high level; the accumulation and transfer operations of the electric charge in a period T2 from the time $t_{13}$ to the time $t_{16}$ are performed in each pixel $P_{m,n}$ in the m-th row, in which the dv(m) designated by the M-bit data DATA2 is at a high level; and the accumulation and transfer operations of the electric charge in a period T3 from the time $t_{18}$ to the time $t_{21}$ are performed in each pixel $P_{m,n}$ in the m-th row, in which the dv(m) designated by the M-bit data DATA3 is at a high level.

Herein, the periods T1 to T3 may be constant time periods or different time periods. The row of the photodetecting section 11 in which the accumulation and transfer operations of the electric charge are performed in each of the periods T1 to T3 may be partially or entirely overlapped, or completely different.

In the operation example described above, the accumulation and the transfer of the electric charge are performed in the same row in each of the periods T1 to T3. However, the electric charge may be accumulated in rows different in each of the periods T1 to T3, and finally, the accumulated electric charge may be collectively transferred. Further, unless the Vreset signal is rendered a high level in the beginning of each of the periods T1 to T3 and the junction capacitance section of the photodiode $PD1_{m,n}$ is discharged, the electric charge may be accumulated in the same row in each of the periods T1 to T3.

Figure 6:
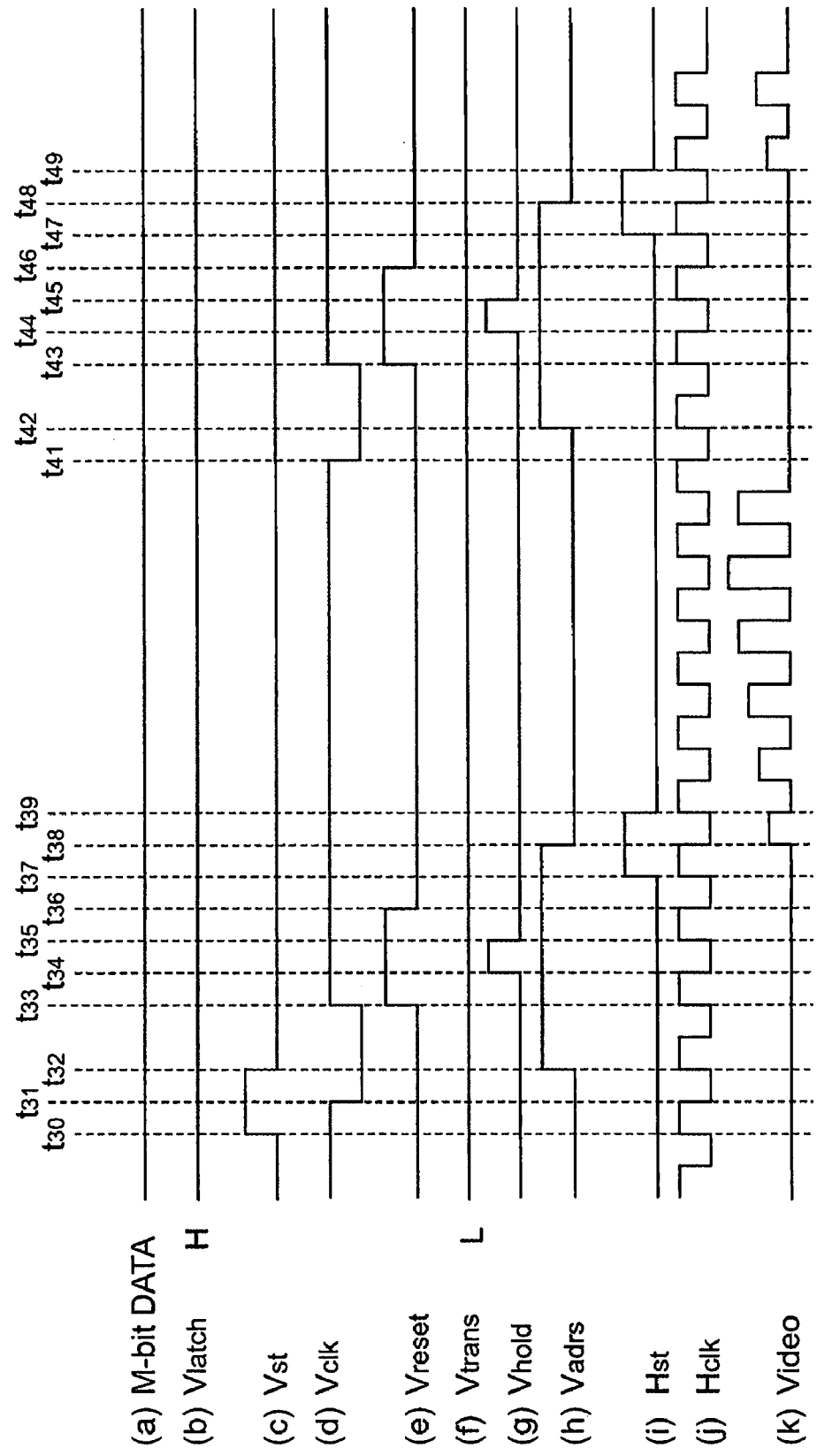
FIG. 6 is a timing chart for describing a data readout operation from the photodetecting section 11 of the solid-state imaging device 1 according to the first embodiment, in which FIG. 6-(a) indicates a timing chart of M-bit data.

After the electric-charge accumulating operation thus described, the data readout operation from the photodetecting section 11 of the solid-state imaging device 1 according to the first embodiment is performed as described below, which is shown in FIG. 6.

FIG. 6 is a timing chart for describing the data readout operation from the photodetecting section 11 of the solid-state imaging device 1 according to the first embodiment.

FIG. 6-(a) indicates a timing chart of the M-bit data; FIG. 6-(b) a timing chart of the Vlatch signal; FIG. 6-(c) a timing chart of the Vst signal; FIG. 6-(d) a timing chart of the Vclk signal; FIG. 6-(e) a timing chart of the Vreset signal; FIG. 6-(f) a timing chart of the Vtrans signal; FIG. 6-(g) a timing chart of the Vhold signal; FIG. 6-(h) a timing chart of the Vadrs signal; FIG. 6-(i) a timing chart of the Hst signal; FIG. 6-(j) a timing chart of the Hclk signal; and FIG. 6-(k) a timing chart of a Video signal.

That is, in FIG. 6, in addition to the above-described (a) to (h), as shown in FIG. 6-(i), the Hst signal is input to the first signal processing section 30, as shown in FIG. 6-(j), the Hclk signal is input to the first signal processing unit 30, and as shown in FIG. 6-(k), the Video signal outputted from the first signal processing unit 30. In a period of the data readout operation, the Vlatch signal is input to the row selecting section 20 constantly at a high level, and the Vtrans signal is input to the row selecting section 20 constantly at a low level.

The Vst signal becomes a high level in a period from a time $t_{30}$ to a time $t_{32}$. At a time $t_{31}$ in this period, the Vclk signal is inverted from a high level to a low level. At a time $t_{33}$, the Vclk signal is inverted to a high level. At a subsequent time $t_{41}$, the Vclk signal is inverted to a low level, and at a time $t_{43}$, the Vclk signal is inverted to a high level. Hereinafter, the Vclk signal changes its level in a similar manner. Such a Vclk signal is input to each of the M of D flip-flops $22_1$ to $22_M$ within the row selecting section 20. Thereby, the shift register configured of the M of D flip-flops $22_1$ to $22_M$ is operated, and the output logical value from the Q output terminal of each of the M of D flip-flops $22_1$ to $22_M$ sequentially becomes a high level. At the same time, the output logical value from each of the M of OR-gate circuits $23_1$ to $23_M$ sequentially becomes a high level.

In a period from the time $t_{31}$ to the time $t_{41}$, only the output logical value from the Q output terminal of the first-stage D flip-flop $22_1$, out of the M of D flip-flops $22_1$ to $22_M$ within the row selecting section 20, becomes a high level, and only the output logical value from the OR-gate circuit $23_1$, out of the M of OR-gate circuits $23_1$ to $23_M$, becomes a high level. The switches $SW2_{1,1}$ to $SW2_{1,4}$ that correspond thereto are closed. In the period from the time $t_{31}$ to the time $t_{41}$, the Vadrs signal is inverted from a low level to a high level at the time $t_{32}$; the Vreset signal is inverted from a low level to a high level at the time $t_{33}$; the Vhold signal is inverted from a low level to a high level at a time $t_{34}$; the Vhold signal is inverted to a low level at a time $t_{35}$; the Vreset signal is inverted to a low level at a time $t_{36}$; and the Vadrs signal is inverted to a low level at a time $t_{38}$.

Thereby, a Vreset(1) signal, a Vhold(1) signal, and a Vadrs (1) signal are applied to each pixel in the first row of the photodetecting section 11, and a voltage value corresponding to an amount of accumulated electric charge is outputted to the wiring $L1_n$ from each pixel $P_{1,n}$ in the first row. At this time, in the period from the time $t_{32}$ to the time $t_{33}$ during which the Vadrs(1) signal is at a high level and the Vreset(1) signal and the Vhold(1) signal are at a low level, the voltage value outputted from each pixel $P_{1,n}$ in the first row represents a value of a lighted output component in which the noise component is superimposed. The voltage is once transferred to and held in the hold circuit $31_n$ of the first signal processing section 30. On the other hand, in the period during which all the Vadrs signal (1), the Vreset(1) signal, and the Vhold(1) signal become a high level, and thereafter, the Vadrs(1) signal remains at a high level but the Vreset(1) signal and the Vhold (1) signal are at a low level, the voltage value outputted from each pixel $P_{1,n}$ in the first row represents a value of the noise component. This voltage also is transferred to and held in the hold circuit $31_n$ of the first signal processing section 30. The voltage values (the lighted output component and the noise component) outputted from each pixel $P_{1,n}$ to the wiring $L1_n$ are held by the hold circuit $31_n$ of the first signal processing section 30.

The voltage value outputted from each pixel $P_{1,n}$ is held by the hold circuit $31_n$, and thereafter, the Hst signal becomes a high level in a period from a time $t_{37}$ to a time $t_{39}$. At the time $t_{38}$ in this period, the Hclk signal is inverted from a high level to a low level. At the time $t_{39}$, the Hclk signal is inverted to a high level. Hereinafter, the Hclk signal periodically changes the level in a similar manner. Such a Hclk signal is input to each of the N of D flip-flops $32_1$ to $32_N$ within the first signal processing section 30, and thereby, the shift register configured of the N of D flip-flops $32_1$ to $32_N$ is operated. The output logical value from the Q output terminal of each of the N of D flip-flops $32_1$ to $32_N$ sequentially becomes a high level, and the switches $SW3_{n,1}$ and $SW3_{n,2}$ arranged on an output side of each hold circuit $31_n$ are sequentially closed.

Thereby, the voltage values (the lighted output component and the noise component) from each of the N of hold circuits $31_1$ to $31_N$ are sequentially outputted to the subtracting circuit 33. In the subtracting circuit 33, the voltage value Video that corresponds to a difference in the two inputted voltage values is computed and outputted. The voltage value Video outputted from the subtracting circuit 33 at this time corresponds to an amount of the electric charge accumulated in each of the pixels $P_{1,1}$ to $P_{1,N}$ in the first row of the photodetecting section 11, and has the noise component removed.

In a subsequent period from the time $t_{41}$ to a time $t_{49}$ and onward, only the output logical value from the Q output terminal of the second-stage D flip-flop $22_2$, out of the M of D flip-flops $22_1$ to $22_M$ within the row selecting section 20, becomes a high level, and the output logical value from the OR-gate circuit $23_2$, out of the M of OR-gate circuits $23_1$ to $23_M$, becomes a high level. The switches $SW2_{2,1}$ to $SW2_{2,4}$ that correspond thereto are closed. In the period from the time $t_{41}$ to the time $t_{49}$ and onward, the Vadrs signal is inverted from a low level to a high level at a time $t_{42}$; the Vreset signal is inverted from a low level to a high level at the time $t_{43}$; the Vhold signal is inverted from a low level to a high level at a time $t_{44}$; the Vhold signal is inverted to a low level at a time $t_{45}$; the Vreset signal is inverted to a low level at a time $t_{46}$; and the Vadrs signal is inverted to a low level at a time $t_{48}$.

Thereby, a Vreset(2) signal, a Vhold(2) signal, and a Vadrs (2) signal are applied to each pixel in the second row of the photodetecting section 11, and a voltage value corresponding to an amount of accumulated electric charge is outputted to the wiring $L1_n$ from each pixel $P_{2,n}$ in the second row. At this time, in the period from the time $t_{42}$ to the time $t_{43}$ during which the Vadrs (2) signal is at a high level and the Vreset(2) signal and the Vhold(2) signal are at a low level, the voltage value outputted from each pixel $P_{2,n}$ in the second row represents a value of a lighted output component in which the noise component is superimposed. The voltage is once transferred to and held in the hold circuit $31_n$ of the first signal processing section 30. On the other hand, in the period during which all the Vadrs(2) signal, the Vreset(2) signal, and the Vhold(2) signal become a high level, and thereafter, the Vadrs(2) signal remains at a high level and the Vreset(2) signal and the Vhold (2) signal are at a low level, the voltage value outputted from each pixel $P_{2,n}$ in the second row represents a value of the noise component. This voltage is also transferred to and held in the hold circuit $31_n$ of the first signal processing section 30. The voltage values (the lighted output component and the noise component) outputted from each pixel $P_{2,n}$ to the wiring $L1_n$ are held by the hold circuit $31_n$ of the first signal processing section 30.

The voltage values outputted from each pixel $P_{2,n}$ are held by the hold circuit $31_n$, and thereafter, the Hst signal becomes a high level in a period from a time $t_{47}$ to the time $t_{49}$. At the time $t_{48}$ in this period, the Hclk signal is inverted from a high level to a low level, and at the time $t_{49}$, the Hclk signal is inverted to a high level. Hereinafter, the Hclk signal periodically changes the level in a similar manner. Such a Hclk signal is input to each of the N of D flip-flops $32_1$ to $32_N$ within the first signal processing section 30, and thereby, the shift register configured of the N of D flip-flops $32_1$ to $32_N$ is operated. The output logical value from the Q output terminal of each of the N of D flip-flops $32_1$ to $32_N$ sequentially becomes a high level, and the switches $SW3_{n,1}$ and $SW3_{n,2}$ arranged on an output side of each hold circuit $31_n$ are sequentially closed.

Thereby, the voltage values (the lighted output component and the noise component) from each of the N of hold circuits $31_1$ to $31_N$ are sequentially outputted to the subtracting circuit 33. In the subtracting circuit 33, the voltage value Video that corresponds to a difference in the two inputted voltage values is computed and outputted. The voltage value Video outputted from the subtracting circuit 33 at this time corresponds to an amount of the electric charge accumulated in each of the pixels $P_{2,1}$ to $P_{2,N}$ in the second row of the photodetecting section 11, and has the noise component removed.

Hereinafter, in a similar manner, the voltage value corresponding to an amount of the electric charge accumulated in each of the pixels $P_{m,1}$ to $P_{m,N}$ in the third row and onward of the photodetecting section 11 is outputted from the pixel in each row of the photodetecting section 11; held by the hold circuits $31_1$ to $31_N$ of the first signal processing section 30; has the noise component removed by the subtracting circuit 33; and outputted from the first signal processing section 30 as the voltage value Video.

As described above, in the solid-state imaging device 1 according to the embodiment, M×N of pixels included in the photodetecting section 11 are two-dimensionally arranged in M rows and N columns, and the pixel $P_{m,n}$ at the m-th row and the n-th column includes the photodiode $PD1_{m,n}$. By the row selecting section 20, one or more rows are selected, out of M rows of the photodetecting section 11, and the electric charge generated in the photodiode $PD1_{m,n}$ in response to the incidence of light is accumulated in each pixel existing in the selected rows. Further, after the electric-charge accumulation in each of the pixels, outputting of the data, by each row of the photodetecting section 11, corresponding to the amount of accumulated electric charge of each pixel is instructed by the row selecting section 20. The data of each pixel, outputted by the instruction from the row selecting section 20 by each row of the photodetecting section 11, is input to the first signal processing section 30, and outputted from the first signal processing section 30 by each pixel.

The accumulation of the electric charge in each pixel in the rows, out of M rows of the photodetecting section 11, selected by the row selecting section 20 can be performed in one period only, and in a plurality of periods as well. When the electric-charge accumulating periods are a plurality, these periods may be constant time periods, or different time periods. The row of the photodetecting section 11 in which the electric charge is accumulated in each of the plurality of periods may be partially or entirely overlapped or completely different. The electric charge generated in the photodiode $PD1_{m,n}$ in only a desired time (which includes a case of a time 0) in each of the M rows of the photodetecting section 11 can thus be accumulated, and therefore, the sensitivity of photo-detection can be differed by each row. That is, even when the contrast of light intensity among the pixels in an image to be imaged is large, it is possible to shorten the electric-charge accumulating time in the row including the pixel of which light intensity in the image is strong, as compared to other rows. Thereby, it is possible to obtain an image of higher quality. That is, by changing the electric-charge accumulating time of each row, it is possible to obtain an image of higher quality even when the contrast of the light intensity among the pixels in the image to be imaged by the solid-state imaging device is larger than a dynamic range of the photodetection of each pixel of the solid-state imaging device.

Second Embodiment

Figure 7:
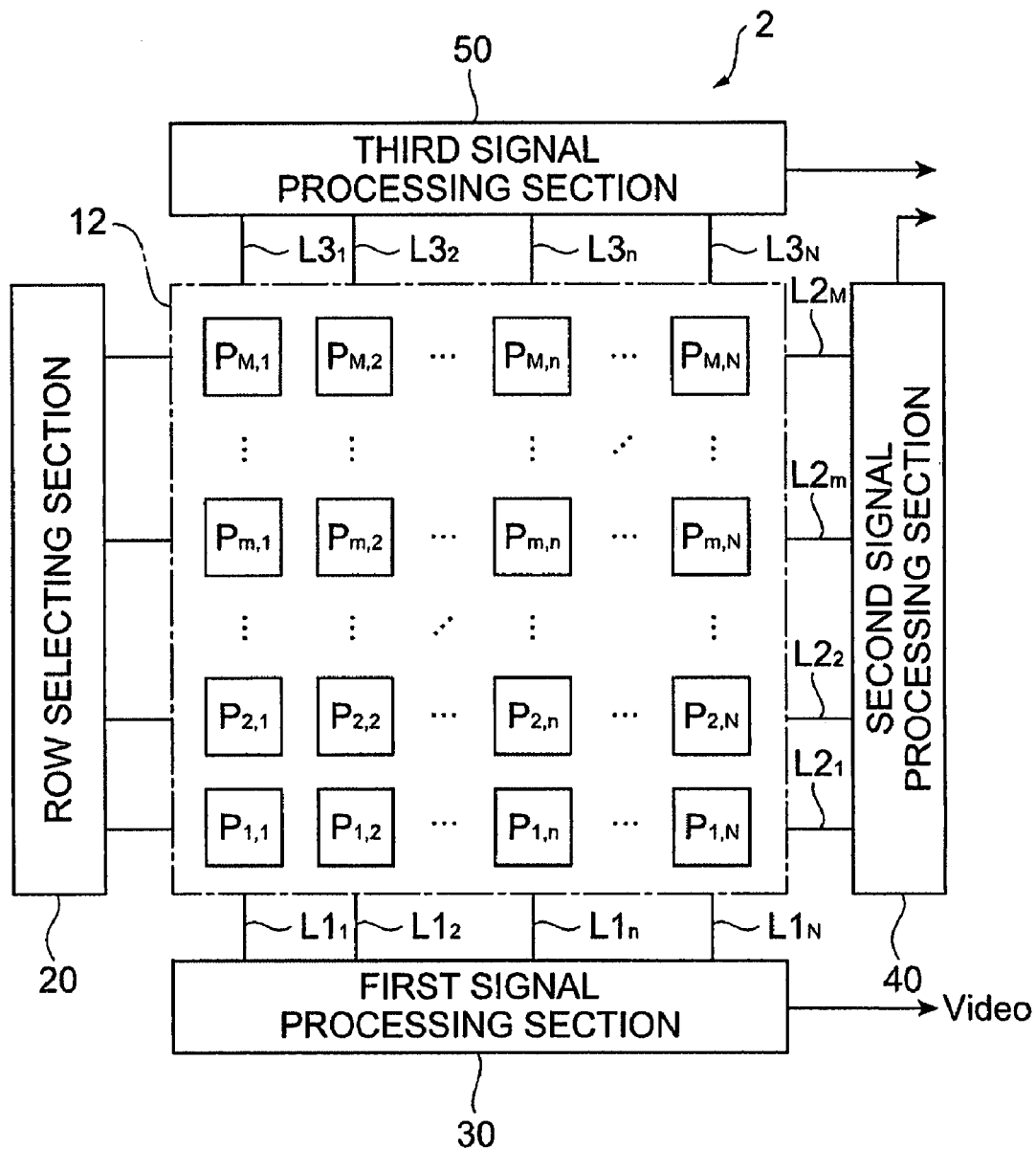
FIG. 7 is a block diagram of a solid-state imaging device 2 according to a second embodiment.

Subsequently, a second embodiment of the solid-state imaging device according to the present invention is described. FIG. 7 is a block diagram of a solid-state imaging device 2 according to the second embodiment. The solid-state imaging device 2 shown in this drawing is provided with a photodetecting section 12, the row selecting section 20, the first signal processing section 30, a second signal processing section 40, and a third signal processing section 50. Each of the row selecting section 20 and the first signal processing section 30 in the second embodiment is the same as the row selecting section 20 and the first signal processing section 30 in the foregoing first embodiment. As compared to the solid-state imaging device 1 according to the first embodiment, the solid-state imaging device 2 according to the second embodiment differs in configuration of each pixel $P_{m,n}$ included in the photodetecting section 12, and differs in that it is further provided with the second signal processing section 40 and the third signal processing section 50.

Figure 8:
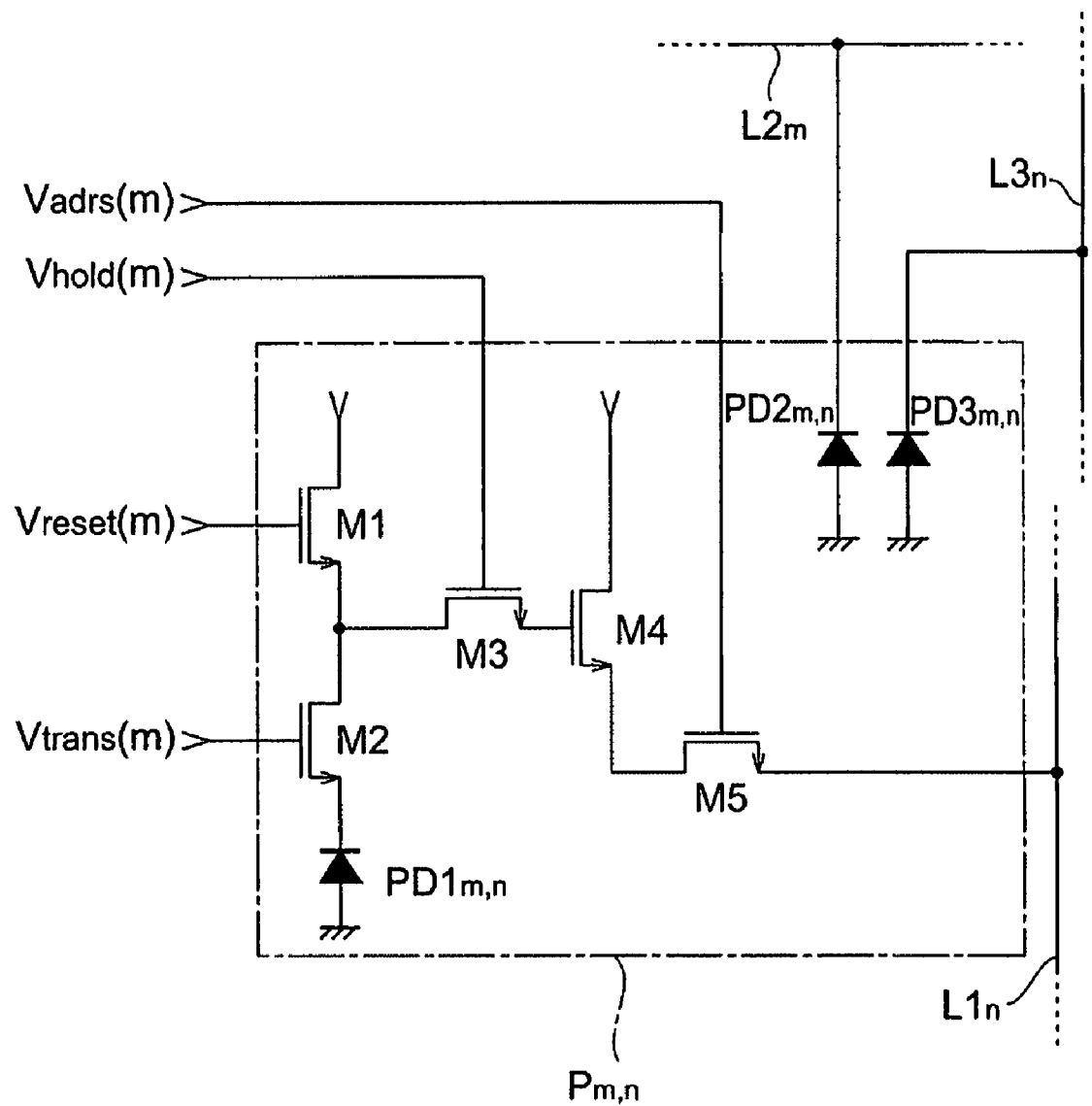
FIG. 8 is a circuit diagram of each pixel $P_{m,n}$ included in a photodetecting section 12 of the solid-state imaging device 2 according to the second embodiment.

FIG. 8 is a circuit diagram of each pixel $P_{m,n}$ included in the photodetecting section 12 of the solid-state imaging device 2 according to the second embodiment. The pixel $P_{m,n}$ in the second embodiment differs in that it further includes a photodiode $PD2_{m,n}$ and a photodiode $PD3_{m,n}$, as compared to the pixel $P_{m,n}$ in the foregoing first embodiment. N of photodiodes $PD2_{m,1}$ to $PD2_{m,N}$ in the m-th row are electrically connected by a wiring $L2_m$, and connected via the wiring, $L2_m$ to the second signal processing section 40. The second signal processing section 40 accumulates electric charges inputted via each wiring $L2_m$ and outputs a voltage value corresponding to an accumulated amount of the electric charges. M of photodiodes $PD3_{1,n}$ to $PD3_{M,n}$ in the n-th column are electrically connected by a wiring $L3_n$, and connected via the wiring $L3_n$ to the third signal processing section 50. The third signal processing section 50 accumulates electric charges inputted via each wiring $L3_n$ and outputs a voltage value corresponding to an accumulated amount of the electric charges.

Figure 9:
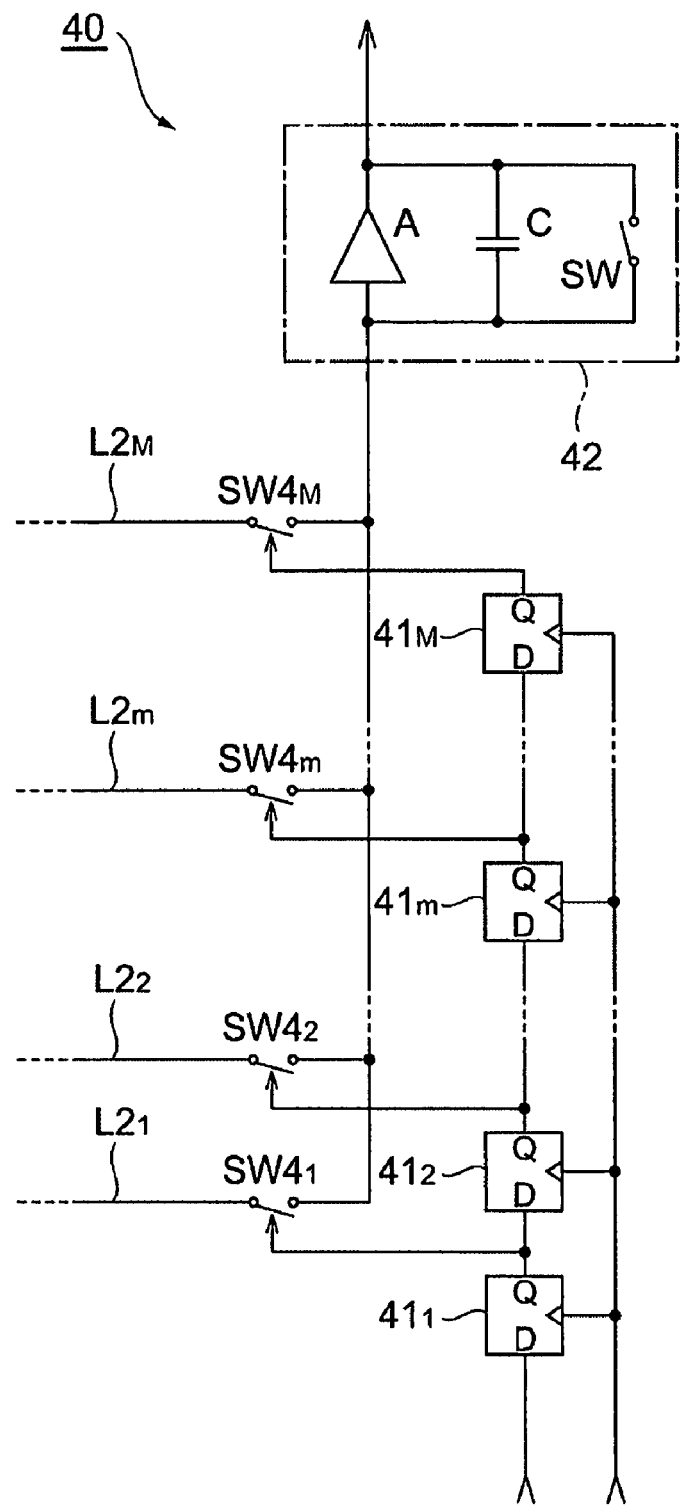
FIG. 9 is a circuit diagram of a second signal processing section 40 of the solid-state imaging device 2 according to the second embodiment.

FIG. 9 is a circuit diagram of the second signal processing section 40 of the solid-state imaging device 2 according to the second embodiment. The second signal processing section 40 includes M of D flip-flops $41_1$ to $41_M$ an integrating circuit 42, and M of switches $SW4_1$ to $SW4_M$. The M of D flip-flops $41_1$ to $41_M$ are dependently connected, and configure a shift register. When the shift register operates, a logical level outputted from a Q output terminal of each of M of D flip-flops $41_1$ to $41_M$ sequentially becomes a high level, M of switches $SW4_1$ to $SW4_M$ are sequentially closed, and M of wirings $L2_1$ to $L2_M$ are sequentially connected to the integrating circuit 42. The integrating circuit 42 is one in which a capacitance element C and a switch SW respectively connected in parallel are arranged between an input terminal and an output terminal of an amplifier A. The switch SW is opened and closed at predetermined timing, and thereby, the integrating circuit 42 can accumulate the inputted electric charge into the capacitance element C and output a voltage value corresponding to an amount of accumulated electric charge.

The voltage value outputted from the integrating circuit 42 of the second signal processing section 40 corresponds to a total of electric charges generated in each of the N of photodiodes $PD2_{m,1}$ to $PD2_{m,N}$ in the m-th row connected to the wiring $L2_m$, and is sequentially outputted in each row. That is, a distribution of the voltage values outputted from the integrating circuit 42 of the second signal processing section 40 represents the addition of a two dimensional distribution of intensity of light incident upon the photodetecting section 12 in the column direction (that is, a one dimensional distribution in the row direction of the intensity of light incident upon the photodetecting section 12).

A configuration of the third signal processing section 50 is the same as that of the second signal processing section 40. A difference in configuration is that the second processing circuit section 40 shown in FIG. 9 is replaced by the third processing circuit 50, the N of photodiodes $PD2_{m,1}$ to $PD2_{m,N}$ in m rows are replaced by M of photodiodes $PD3_{1,n}$ to $PD3_{M,n}$ in n columns (e.g., each row is replaced by each column), and a wiring $L2_m$ by $L3_n$. That is, a voltage value outputted from the third signal processing section 50 corresponds to a total of electric charges generated in each of the M of photodiodes $PD3_{1,n}$ to $PD3_{M,n}$ in the n-th column connected to the wiring $L3_n$, and sequentially outputted by each column. That is, a distribution of the voltage value outputted from the third signal processing section 50 represents the addition of a two dimensional distribution of intensity of light incident upon the photodetecting section 12 in the row direction (that is, a one dimensional distribution in the column direction of the intensity of light incident upon the photodetecting section 12).

In the solid-state imaging device 2 according to the second embodiment, the distribution of the voltage value outputted from each of the second signal processing section 40 and the third signal processing section 50 is used, and thus, it becomes possible to determine whether the contrast of light intensity among pixels in an image to be imaged is larger than a dynamic range of photodetection of each pixel, and further, it becomes possible to more appropriately set an electric-charge accumulating time in each row of the photodetecting section 12 by the row selecting section 20. In the embodiment, similar to the first embodiment, it is possible to obtain an image of higher quality by changing the electric-charge accumulating time of each row, even when the contrast of light intensity among the pixels in the image to be imaged by the solid-state imaging device is larger than the dynamic range of photodetection of each pixel of the solid-state imaging device, and further, it is possible to set the appropriate electric-charge accumulating time to each row.

(Modification)

The present invention is not limited to the above-described embodiments, and can be modified in various forms. For example, each pixel $P_{m,n}$ of the photodetecting section adopts the APS structure in the above-described embodiments, and a PPS (Passive Pixel Sensor) structure may also be adopted.

INDUSTRIAL APPLICABILITY

The present invention is applicable to a solid-state imaging device.

The invention claimed is:
1. A solid-state imaging device, comprising:
a photodetecting section in which M×N of pixels are two-dimensionally arranged in M rows and N columns, each of the pixels includes a photodiode respectively, and a pixel $P_{m,n}$ existing at an m-th row and an n-th column includes a photodiode $PD1_{m,n}$;

a row selecting section that selects one or more rows, out of M rows of the photodetecting section, instructs each pixel in the selected rows to accumulate an electric charge generated in the photodiode $PD1_{m,n}$ in response to the incidence of light, and instructs to output data corresponding to an amount of accumulated electric charge of each pixel by each row of the photodetecting section; and a first signal processing section that inputs data of each pixel, outputted by each row of the photodetecting section by an instruction from the row selecting section, and outputs the data by each pixel, wherein each electric-charge accumulating time of each row of the photodetecting section is changed, where M and N each represent an integer of 2 or more, m represents any integer equal to or greater than 1 but equal to or smaller than M, and n represents any integer equal to or greater than 1 but equal to or smaller than N.

2. The solid-state imaging device according to claim 1, wherein each pixel $P_{m,n}$ of the photodetecting section further comprises a photodiode $PD2_{m,n}$, and N of photodiodes $PD2_{m,1}$ to $PD2_{m,N}$ in the m-th row are electrically connected by a wiring $L2_m$, the solid-state imaging device further comprises a second signal processing section that inputs and accumulates electric charges generated in the N of photodiodes $PD2_{m,1}$ to $PD_{m,N}$ connected to each wiring $L2_m$, and outputs a voltage value that corresponds to an accumulated amount of the electric charges.

3. The solid-state imaging device according to claim 1, wherein each pixel $P_{m,n}$ of the photodetecting section further comprises a photodiode $PD3_{m,n}$ and M of photodiodes $PD3_{1,n}$ to $PD3_{M,n}$ in the n-th column are electrically connected by a wiring $L3_n$, the solid-state imaging device further comprises a third signal processing section that inputs and accumulates electric charges generated in the M of photodiodes $PD3_{1,n}$ to $PD3_{M,n}$ connected to each wiring $L3_n$, and outputs a voltage value that corresponds to an accumulated amount of the electric charges.

4. The solid-state imaging device according to claim 1, wherein each pixel $P_{m,n}$ is an active pixel sensor.

5. The solid-state imaging device according to claim 1, wherein each pixel $P_{m,n}$ includes:

said photodiode $PD1_{m,n}$; and first, second, third, fourth and fifth transistors, wherein a reference voltage is input to a drain terminal of the first transistor (M1);

wherein a source terminal of the first transistor (M1) is connected to a drain terminal of the second transistor (M2);

wherein a source terminal of the second transistor (M2) is connected to a cathode terminal of the photodiode $PD1_{m,n}$;

wherein an anode terminal of the photodiode $PD1_{m,n}$ is grounded;

wherein a drain terminal of the third transistor (M3) is connected to the source terminal of the first transistor (M1) and the drain terminal of the second transistor (M2);

wherein a source terminal of the third transistor (M3) is connected to a gate terminal of the fourth transistor (M4);

wherein a drain terminal of the fourth transistor (M4) inputs a reference voltage;

wherein a source terminal of the fourth transistor (M4) is connected to a drain terminal of the fifth transistor (M5); and wherein a source terminal of the fifth transistor (M5) is connected to the first signal processing section.

6. The solid-state imaging device according to claim 5, wherein a Vreset(m) signal is input to a gate terminal of the first transistor (M1);

wherein a Vtrans(m) signal is input to a gate terminal of the second transistor (M2); wherein a Vhold(m) signal is input to a gate terminal of the third transistor (M3);

wherein a Vadrs(m) signal is input to a gate terminal of the fifth transistor (M5);

wherein the Vreset(m) signal, the Vtrans(m) signal, the Vhold(m) signal, and the Vadrs(m) signal are outputted from the row selecting section commonly to the N of pixels $P_{m,1}$ to $P_{m,N}$ in the m-th row of the photo detecting section;

wherein in an electric-charge accumulating operation in the photodetecting section, when the Vadrs(m) signal is constantly remains a low level, a first pair of Vreset(m) signal and Vtrans(m) signal becomes simultaneously high level during a first period, and a second pair of Vtrans(m) signal and Vhold(m) signal becomes simultaneously high level during a second period.

7. The solid-state imaging device according to claim 6, wherein the row selecting section includes a latch circuit;

wherein a Vlatch signal and M-bit data are input to the latch circuit, holds as dv(m) a level of the m-th bit, out of the M-bit data, at the timing that the Vlatch signal is inverted from a high level to a low level, and from this point onward, outputs the held levels of dv(1) to dv(M), wherein Vreset(m) signal, Vtrans(m) signal and Vhold(m) signal output in response to the levels of dv(1) to dv(M).

* * * * *